United States Patent
Kuncl et al.

(10) Patent No.: US 9,654,818 B2
(45) Date of Patent: May 16, 2017

(54) CONTENT DELIVERY SYSTEM WITH AUGMENTED REALITY MECHANISM AND METHOD OF OPERATION THEREOF

(71) Applicant: Samsung Electronics Co., Ltd., Gyeonggi-Do (KR)

(72) Inventors: Parker Ralph Kuncl, Los Gatos, CA (US); Dhana Dhanasarnsombat, San Jose, CA (US); Daniela Karin Busse, San Francisco, CA (US); James M. A. Begole, Los Altos, CA (US)

(73) Assignee: Samsung Electronics Co., Ltd., Gyeonggi-Do (KR)

(*) Notice: Subject to any disclaimer, the term of this patent is extended or adjusted under 35 U.S.C. 154(b) by 153 days.

(21) Appl. No.: 13/780,497

(22) Filed: Feb. 28, 2013

(65) Prior Publication Data

US 2014/0240352 A1    Aug. 28, 2014

(51) Int. Cl.
| | |
|---|---|
| G09G 5/00 | (2006.01) |
| H04N 21/414 | (2011.01) |
| G06T 11/00 | (2006.01) |
| H04N 21/258 | (2011.01) |
| H04N 21/2668 | (2011.01) |
| H04N 21/4223 | (2011.01) |
| H04N 21/431 | (2011.01) |
| H04N 21/422 | (2011.01) |
| H04N 21/4788 | (2011.01) |

(52) U.S. Cl.
CPC ....... *H04N 21/41407* (2013.01); *G06T 11/00* (2013.01); *H04N 21/25841* (2013.01); *H04N 21/2668* (2013.01); *H04N 21/4223* (2013.01); *H04N 21/4312* (2013.01); *H04N 21/42202* (2013.01); *H04N 21/4788* (2013.01)

(58) Field of Classification Search
CPC ........ G06T 19/006; G06T 19/00; G06F 3/011
USPC ........................................................ 345/633
See application file for complete search history.

(56) References Cited

U.S. PATENT DOCUMENTS

| | | | | |
|---|---|---|---|---|
| 7,930,762 | B1* | 4/2011 | Blair et al. | 726/28 |
| 2004/0056879 | A1* | 3/2004 | Erdelyi | G06F 17/30793 715/716 |
| 2009/0144768 | A1* | 6/2009 | Nagaraja | H04N 5/44543 725/39 |
| 2011/0321072 | A1* | 12/2011 | Patterson | H04N 21/44222 725/5 |
| 2012/0004956 | A1 | 1/2012 | Huston et al. | |

(Continued)

FOREIGN PATENT DOCUMENTS

| | | |
|---|---|---|
| KR | 1020100124947 A | 11/2010 |
| KR | 101135186 B1 | 4/2012 |

(Continued)

*Primary Examiner* — Kyle Zhai
(74) *Attorney, Agent, or Firm* — IP Investment Law Group

(57) ABSTRACT

A content delivery system includes: a registration module configured to identify a registration type for calibrating a current location of a device; a tracker module, coupled to the registration module, configured to track a subject of interest based on a context; a source module, coupled to the tracker module, configured to determine an information source based on the registration type; and a content module, coupled to the source module, configured to generate an overlay content based on the information source for displaying the overlay content for the subject of interest on the device.

18 Claims, 6 Drawing Sheets

(56) References Cited

U.S. PATENT DOCUMENTS

| | | |
|---|---|---|
| 2012/0099000 A1 | 4/2012 | Kim |
| 2012/0269494 A1 | 10/2012 | Satyanarayana et al. |
| 2012/0306920 A1 | 12/2012 | Bathiche et al. |
| 2012/0323612 A1* | 12/2012 | Callaghan .............. G06Q 10/02 705/5 |
| 2013/0097635 A1* | 4/2013 | Yerli ............................... 725/37 |
| 2013/0267309 A1* | 10/2013 | Robbins et al. ................ 463/31 |
| 2014/0130079 A1* | 5/2014 | Arora et al. .................... 725/24 |

FOREIGN PATENT DOCUMENTS

| | | |
|---|---|---|
| KR | 20120075565 A | 7/2012 |
| KR | 1020120094727 A | 8/2012 |
| KR | 101215515 B1 | 12/2012 |

* cited by examiner

US 9,654,818 B2

CONTENT DELIVERY SYSTEM WITH AUGMENTED REALITY MECHANISM AND METHOD OF OPERATION THEREOF

TECHNICAL FIELD

An embodiment of the present invention relates generally to a content delivery system, and more particularly to a system for augmented reality mechanism.

BACKGROUND

Modem portable consumer and industrial electronics, especially client devices such as navigation systems, cellular phones, portable digital assistants, and combination devices are providing increasing levels of functionality to support modem life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide personalized content through a mobile device, such as a cell phone, smart phone, or a personal digital assistant.

Personalized content services allow users to create, transfer, store, and/or consume information in order for users to create, transfer, store, and consume in the "real world." One such use of personalized content services is to efficiently transfer or guide users to the desired product or service.

Content delivery system and personalized content services enabled systems have been incorporated in automobiles, notebooks, handheld devices, and other portable products. Today, these systems aid users by incorporating available, real-time relevant information, such as advertisement, entertainment, local businesses, or other points of interest (POI).

Thus, a need still remains for a content delivery system with augmented reality mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a content delivery system including: a registration module configured to identify a registration type for calibrating a current location of a device; a tracker module, coupled to the registration module, configured to track a subject of interest based on a context; a source module, coupled to the tracker module, configured to determine an information source based on the registration type; and a content module, coupled to the source module, configured to generate an overlay content based on the information source for displaying the overlay content for the subject of interest on the device.

An embodiment of the present invention provides a method of operation of a content delivery system including: identifying a registration type for calibrating a current location of a device; tracking a subject of interest based on a context; determining an information source based on the registration type; and generating an overlay content based on the information source with a control unit for displaying the overlay content for the subject of interest on the device.

An embodiment of the present invention provides a non-transitory computer medium including: determining a context based on an environmental condition; identifying a registration type for calibrating a current location of a device; tracking a subject of interest based on the context; determining an information source based on the registration type; and generating an overlay content based on the information source with a control unit for displaying the overlay content for the subject of interest on the device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
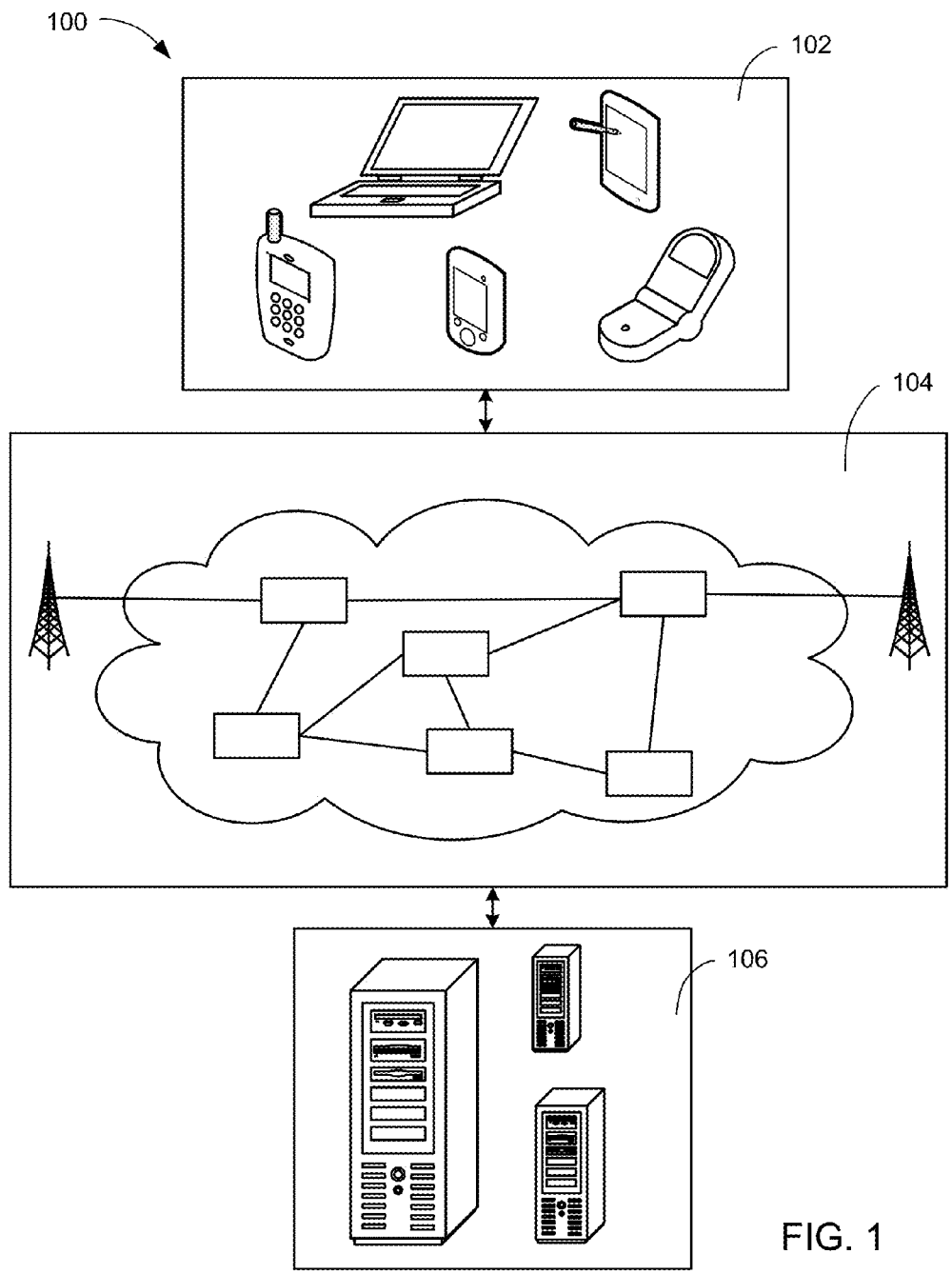
FIG. 1 is a content delivery system with augmented reality mechanism in an embodiment of the present invention.

The following embodiments of the present invention generate an overlay content regarding a subject of interest in a venue for displaying on a device. The overlay content can be generated based on a context and an information source for providing a perspective on the subject of interest from other than a user of the device.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a content delivery system 100 with augmented reality mechanism in an embodiment of the present invention. The content delivery system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of display devices, such as a cellular phone, personal digital assistant, wearable digital device, tablet, notebook computer, television (TV), automotive telematic communication system, or other multi-functional mobile communication or entertainment device. The first device 102 can be a standalone device, or can be incorporated with a vehicle, for example a car, truck, bus, aircraft, boat/vessel, or train. The first device 102 can couple to the communication path 104 to communicate with the second device 106.

For illustrative purposes, the content delivery system 100 is described with the first device 102 as a display device, although it is understood that the first device 102 can be different types of devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Android™ smartphone, or Windows™ platform smartphone.

For illustrative purposes, the content delivery system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, aircraft, boat/vessel, or train.

Also for illustrative purposes, the content delivery system 100 is shown with the second device 106 and the first device 102 as end points of the communication path 104, although it is understood that the content delivery system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, wireless High-Definition Multimedia Interface (HDMI), Near Field Communication (NFC), Infrared Data Association standard (IrDA), wireless fidelity (WiFi), and worldwide interoperability for microwave access (WiMAX) are examples of wireless communication that can be included in the communication path 104. Ethernet, HDMI, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
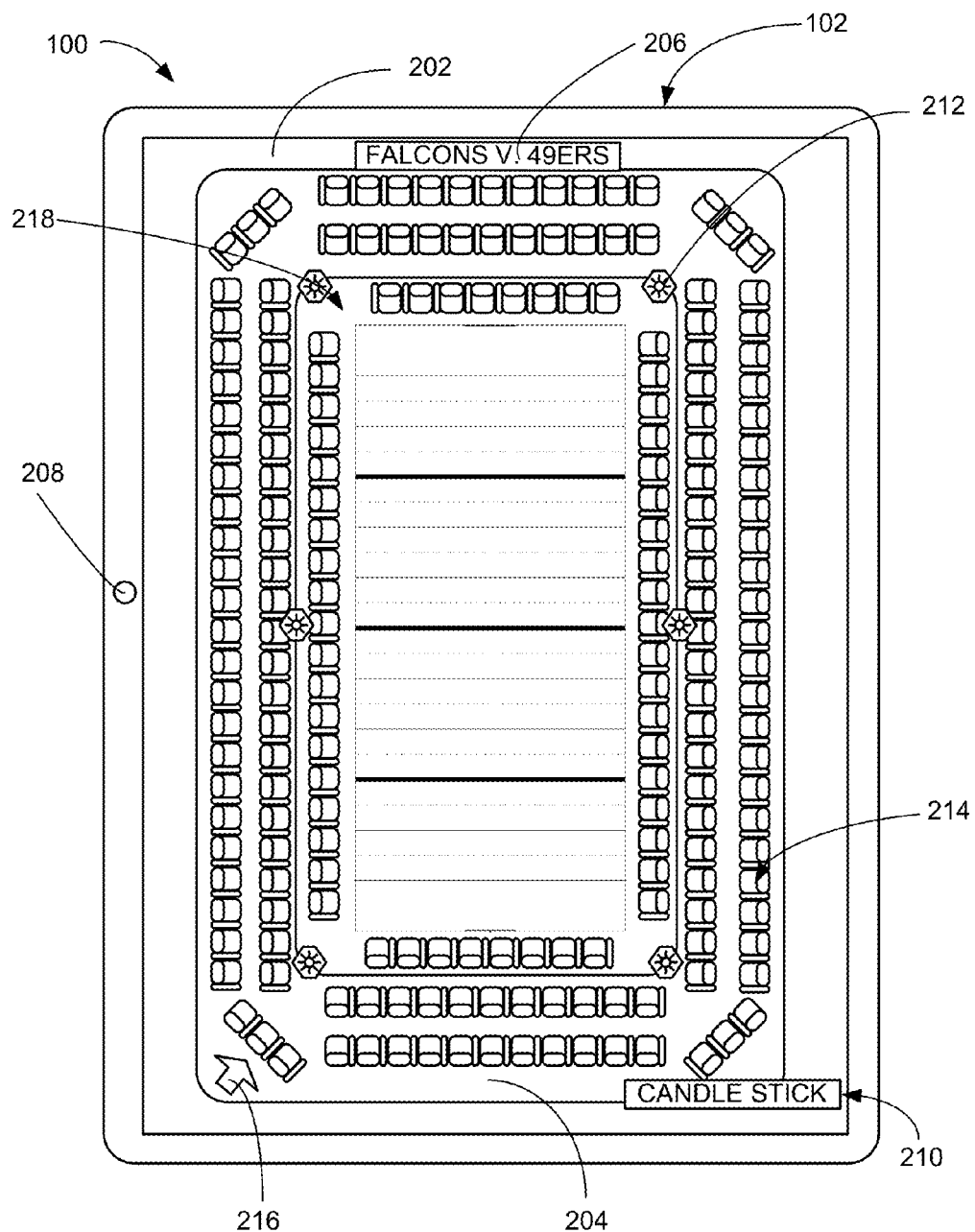
FIG. 2 is a first example of a display interface of the first device displaying a venue.

Referring now to FIG. 2, therein is shown a first example of a display interface 202 of the first device 102 displaying a venue 204. The venue 204 is a physical setting for an event type 206. For example, the venue 204 can represents a sports stadium, a concert hall, a theater, or a combination thereof. The event type 206 is a category for the activity held in the venue 204. For example, the event type 206 can represent an American football game, a rock concert, a conference, or a ballet show. FIG. 2 can illustrate the American football game between the Atlanta Falcons™ versus the San Francisco 49ers™.

A capturing sensor 208 of the first device 102 can capture the venue 204 for displaying the display interface 202. For example, the capturing sensor 208 can represent a digital camera, a video camera, or a combination thereof. The capturing sensor 208 can capture images, such as a digital photograph, within the venue 204.

For clarity and brevity, the discussion of the present invention will focus on the first device 102 displaying the result generated by the content delivery system 100. However, the second device 106 and the first device 102 can be discussed interchangeably.

A venue type 210 is a category of the venue 204. For example, the venue type 210 can include the venue 204 for sports, the venue 204 for music event, or a combination thereof. More specifically, the venue type 210 can include a sports stadium, a conference hall, a theater, an opera, an event hall, an amusement park, or a combination thereof.

The venue 204 can include a location marker 212. The location marker 212 is a calibration mechanism to determine a current location 214 and an orientation 216 of the first device 102. For example, the location marker 212 can include an electric beacon, such as a radio beacon, to calibrate the current location 214 of the first device 102 within the venue 204.

The current location 214 can represent the physical location of the first device 102 within the venue 204. The orientation 216 is the direction of the user of first device 102, the first device 102, or a combination thereof facing within the venue 204. For example, the orientation 216 can be calibrated in accordance to the location of the field, the center stage, or a combination thereof. The first device 102 can receive or detect a calibration reference from a plurality of the location marker 212 to determine in what direction the user of the first device 102, the first device 102, or a combination thereof is facing. The calibration reference can represent a radio signal, a reference point, or a combination thereof.

The current location 214 of the first device 102 can signify a registration type 218 of the user of the first device 102. The registration type 218 is category of referencing origin in the venue 204. For example, the registration type 218 can include a courtside seat, field level seat, box seat, upper deck, or upper furthest section.

The first device 102 can receive the result generated by the content delivery system 100 regarding the event type 206 captured within the venue 204 by the capturing sensor 208. The result generated by the content delivery system 100 can differ based on the registration type 218 of the user with the first device 102 to provide result tailored to the user.

Figure 3:
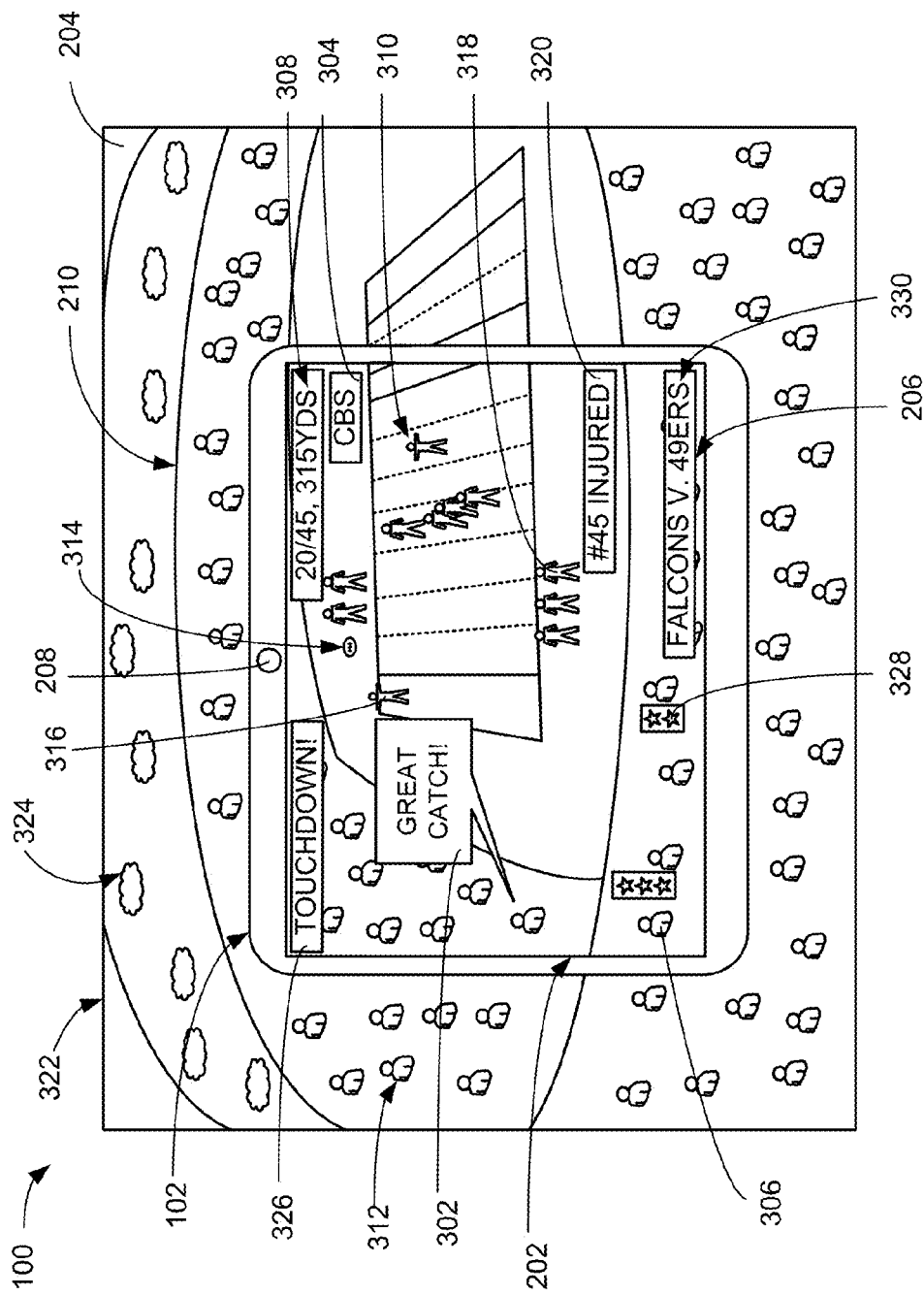
FIG. 3 is a second example of the display interface of the first device displaying an overlay content.

Referring now to FIG. 3, therein is shown a second example of the display interface 202 of the first device 102 displaying an overlay content 302. The overlay content 302 is information superimposed over an image captured by the capturing sensor 208 of the first device 102. For example, the overlay content 302 can include augmented reality notification. The overlay content 302 can be provided by an information source 304. For another example, the overlay content 302 can include a message from a social networking site (SNS) generated by an audience member 306 within the venue 204.

The information source 304 is a provider of subject information 308. For example, the information source 304 can represent the audience member 306 who can use a device with the content delivery system 100 to share his or her opinion. For another example, the information source 304 can represent a major media network, such as ESPN™, CBS™, or FOX™, an American television networks.

The audience member 306 is other users of the device having content delivery system 100. The audience member 306 can be present at the venue 204, outside of the venue 204, or a combination thereof. The audience member 306 can share his or her opinion regarding the event type 206 occurring in the venue 204. For example, the audience member 306 can also be the provider of the subject information 308 regarding a subject of interest 310.

The audience member 306 can be categorized with an audience type 312. The audience type 312 is a category of the audience member 306. For example, the audience type 312 can represent whether the audience member 306 is a Falcons™ fan or 49ers™ fan. For another example, the audience type 312 can categorize the audience member 306 based on the seating area within the venue 204. More specifically, the audience type 312 can categorize the audience member 306 as fans sitting in the courtside seat, field level seat, box seat, upper deck, or upper furthest section.

The subject information 308 is facts or knowledge related to the subject of interest 310, a situation 314 occurring within the venue 204, or a combination thereof. The subject of interest 310 is a performer within the venue 204 interested by the user of the first device 102. For example, the subject of interest 310 can represent a quarterback for the 49ers™. The situation 314 can represent the action performed by the performer of the event type 206. The subject information 308 can represent the game statistics for the subject of interest 310 representing the quarterback related to the situation 314 representing number of passes completed by the quarterback.

A subject location 316 is the physical location of the subject of interest 310 within the venue 204. For example, the subject of interest 310 can represent a running back. After scoring a touchdown, the subject location 316 of the running back can represent the end zone on the football field.

An organization status 318 is a position, rank, prominence, or a combination thereof of the subject of interest 310. For example, the organization status 318 of the subject of interest 310 can represent a starter or backup player within a football team. For another example, the organization status 318 of the subject of interest 310 can represent a prima ballerina within a ballet company.

A status change 320 is the change in a condition of the subject of interest 310. For example, the status change 320 can represent the subject of interest 310 changing from being on the field to off the field. For another example, the status change 320 can represent the subject of interest 310 changing from being healthy to being injured.

A context 322 can influence the overlay content 302 displayed on the display interface 202. The context 322 is a situation, environment, or a combination thereof where the user of the first device 102 is situated. For example, the context 322 can consist of various instances of an environmental condition 324. For example, the environmental condition 324 can include a weather condition, a noise level, or a combination thereof within the venue 204. For another example, the environmental condition 324 can include the audience type 312, the venue type 210, or a combination thereof. For further example, the context 332 can consist of the environmental condition 324 within the venue 204.

For further example, the environmental condition 324 can include a situation type 326. The situation type 326 is a category of the situation 314. For example, the situation 314 can represent the quarterback passing the ball to the receiver for a touchdown. The situation type 326 can represent a passing touchdown. For another example, the situation 314 can represent a tied ball game after the regulation period. The situation type 326 can represent the beginning of an overtime period.

A social status 328 is a reputation of the information source 304. For example, the social status 328 can represent the number of positive feedback received by the audience member 306 within the SNS. For another example, the social status 328 can represent the number of award received by the information source 304 representing a television network.

A user's interest 330 is a predilection of the user of the first device 102. For example, the user's interest 330 can include the San Francisco 49ers.

Figure 4:
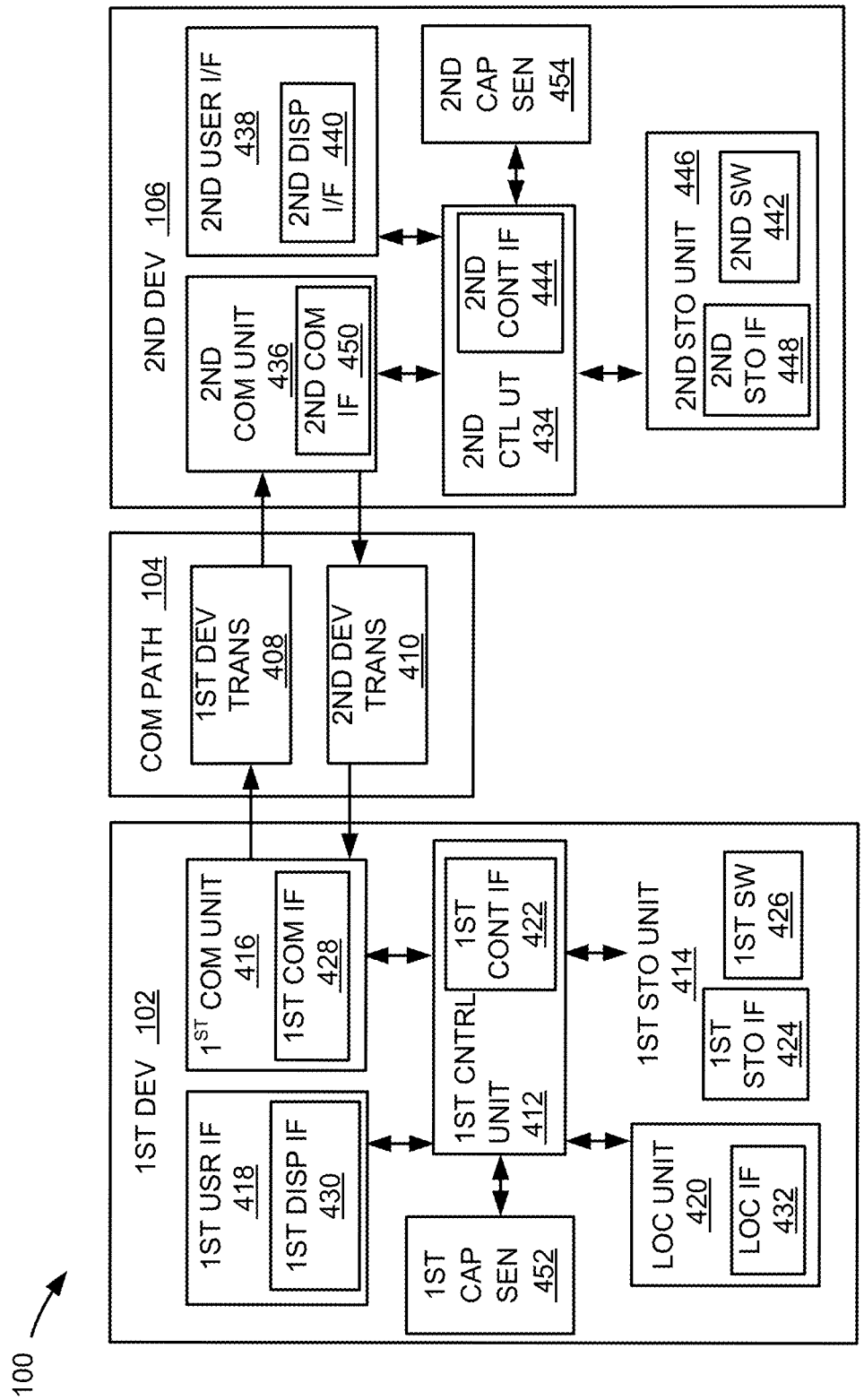
FIG. 4 is an exemplary block diagram of the content delivery system.

Referring now to FIG. 4, therein is shown an exemplary block diagram of the content delivery system 100. The content delivery system 100 can include the first device 102, the communication path 104, and the second device 106.

The first device 102 can send information in a first device transmission 408 over the communication path 104 to the second device 106. The second device 106 can send information in a second device transmission 410 over the communication path 104 to the first device 102.

For illustrative purposes, the content delivery system 100 is shown with the first device 102 as a client device, although it is understood that the content delivery system 100 can have the first device 102 as a different type of device. For example, the first device 102 can be a server having a display interface.

Also for illustrative purposes, the content delivery system 100 is shown with the second device 106 as a server, although it is understood that the content delivery system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of the present invention.

The first device 102 can include a first control unit 412, a first storage unit 414, a first communication unit 416, a first user interface 418, and a location unit 420. The first control unit 412 can include a first control interface 422. The first control unit 412 can execute a first software 426 to provide the intelligence of the content delivery system 100.

The first control unit 412 can be implemented in a number of different manners. For example, the first control unit 412 can be a processor, an application specific integrated circuit (ASIC) an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations physically separate from to the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations physically separate from the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof. The relevant information can also include news, media, events, or a combination thereof from the third party content provider.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations physically separate from the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106 of FIG. 1, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, an infrared sensor for receiving remote signals, or any combination thereof to provide data and communication inputs.

The first user interface 418 can include a first display interface 430. The first display interface 430 can include a display, a projector, a video screen, a speaker, or any combination thereof.

The first control unit 412 can operate the first user interface 418 to display information generated by the content delivery system 100. The first control unit 412 can also execute the first software 426 for the other functions of the content delivery system 100, including receiving location information from the location unit 420. The first control unit 412 can further execute the first software 426 for interaction with the communication path 104 via the first communication unit 416.

The second device 106 can be optimized for implementing the embodiment of the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the content delivery system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the content delivery system 100, including operating the second communication unit 436 to communicate with the first device 102 over the communication path 104.

The second control unit 434 can be implemented in a number of different manners. For example, the second control unit 434 can be a processor, an embedded processor, a microprocessor, hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations physically separate from the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the content delivery system 100 is shown with the second storage unit 446 as a single hierarchy storage system, although it is understood that the content delivery system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations physically separate from the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The content delivery system 100 can be executed by the first control unit 412, the second control unit 434, or a combination thereof. For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the content delivery system 100 is described by operation of the first device 102 and the second device 106. It is understood that the first device 102 and the second device 106 can operate any of the modules and functions of the content delivery system 100. For example, the first device 102 is described to operate the location unit 420, although it is understood that the second device 102 can also operate the location unit 420.

A first capturing sensor 452 can be the capturing sensor 208 of FIG. 2. The first capturing sensor 452 can capture the situation 314 of FIG. 3 occurring in the venue 204 of FIG. 2. Examples of the first capturing sensor 452 can include a digital camera, video camera, thermal camera, night vision camera, infrared camera, x-ray camera, or the combination thereof. Examples of the first capturing sensor 452 can include accelerometer, thermometer, microphone, wireless signal receiver, remote physiological monitoring device, light identifier, or the combination thereof.

A second capturing sensor 454 can be the capturing sensor 208. The second capturing sensor 454 can capture the situation 314 occurring in the venue 204. Examples of the second capturing sensor 454 can include a digital camera, video camera, thermal camera, night vision camera, infrared camera, x-ray camera, or the combination thereof. Examples of the second capturing sensor 454 can include accelerometer, thermometer, microphone, wireless signal receiver, remote physiological monitoring device, light identifier, or the combination thereof.

Figure 5:
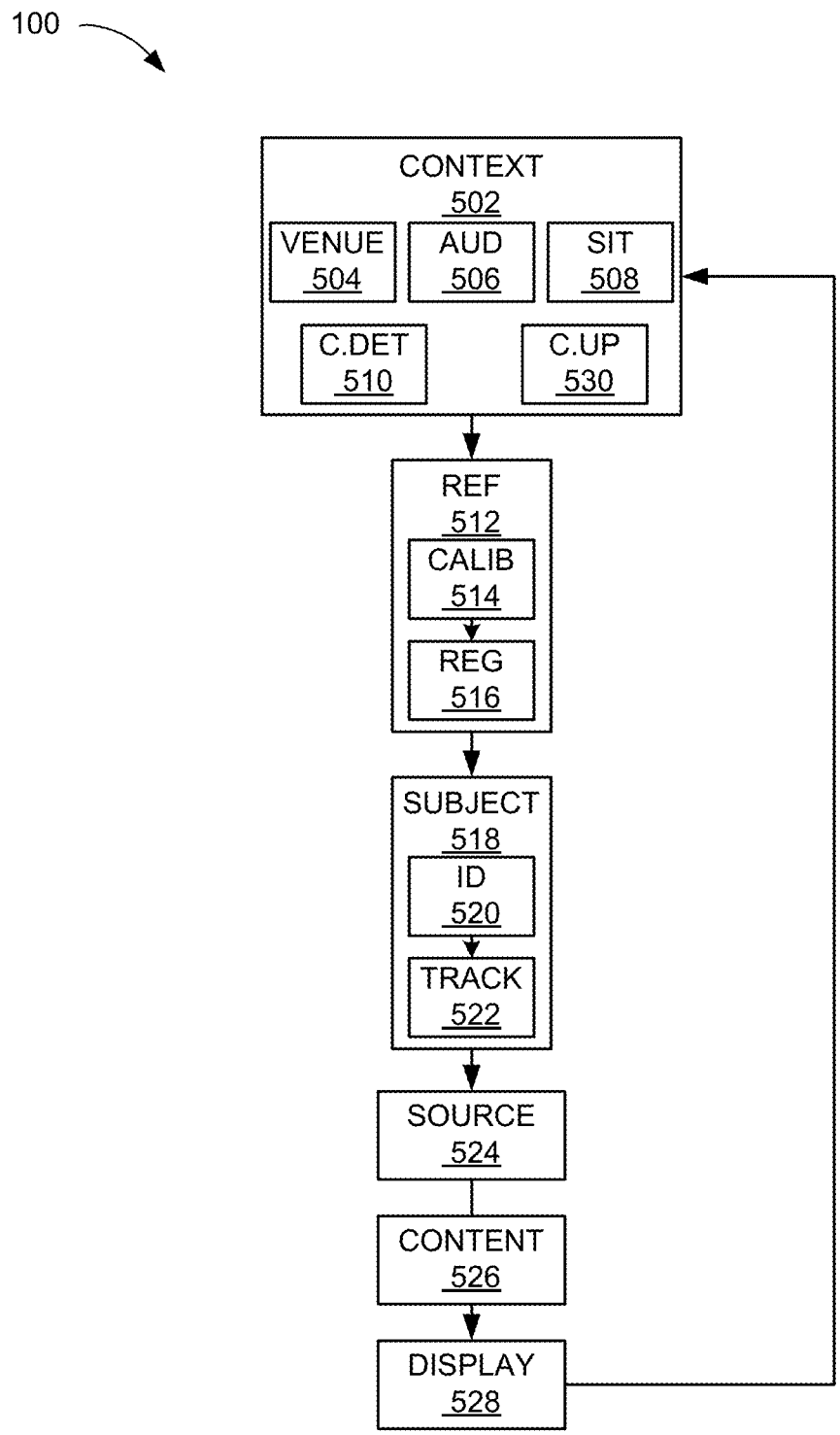
FIG. 5 is a control flow of the content delivery system.

Referring now to FIG. 5 therein is shown a control flow of the content delivery system 100. The content delivery system 100 can include a context module 502. The context module 502 determines the context 322 of FIG. 3. For example, the context module 502 can determine the context 322 based on identifying the environmental condition 324 of FIG. 3 of where the first device 102 of FIG. 1 is situated.

The context module 502 can identify the environmental condition 324 in a number of ways. The context module 502 can include a venue module 504. The venue module 504 determines the venue type 210 of FIG. 2. For example, the venue module 504 can identify the environmental condition 324 by determining the venue type 210 where the first device 102 is located. More specifically, the venue module 504 can receive the location information of the first device 102 from the location unit 420 of FIG. 4.

By comparing the location information of the first device 102 to the address information of the geographic location of the venue 204 stored in the first storage unit 414 of FIG. 4, the venue module 504 can determine the type of location where the first device 102 is located. And, for example, the location can represent an American football stadium. The venue module 504 can determine the venue type 210 where the first device 102 is situated to be the venue 204 representing a sports stadium. Based on the venue type 210, the venue module 504 can identify the environmental condition 324 to be a sports event.

For another example, the context module 502 can identify the environmental condition 324 by determining the audience type 312 of FIG. 3. The context module 502 can include an audience module 506. The audience module 506 determines the audience type 312. For example, the audience module 506 can determine the audience type 312 based on identifying the venue type 210, the seat location within the venue 204 of FIG. 2, the event type 206 of FIG. 2, or a combination thereof.

Continuing from the previous example, the venue type 210 identified can represents the American football stadium for Atlanta Falcons™, an American football team. The audience module 506 can identify the event type 206 based on receiving the relevant information from external sources via the first control interface 422 of FIG. 4. The event type 206 can represent the matchup for the American football game, such as the San Francisco 49ers™ versus the Atlanta Falcons™. Furthermore, the audience module 506 can identify the seat location within the venue 204 by receiving the seat map of the venue 204 from the external source via the first control interface 422. For example, the seat location can represent the section within the venue 204 for the home crowd. Based on the factors discussed above, the audience module 506 can determine the audience type 312 surrounding the first device 102 to represent Falcons™ fan. Moreover, the audience module 506 can identify the environmental condition 324 to be away game for the user, who is a 49er fan according to the user's interest 330 of FIG. 3.

For a different example, the context module 502 can identify the environmental condition 324 by determining the situation type 326 of FIG. 3. The context module 502 can include a situation module 508. The situation module 508 determines the situation type 326. For example, the situation module 508 can determine the situation type 326 based on identifying the venue type 210, the situation 314 of FIG. 3, or a combination thereof.

Continuing from the previous example, the venue type 210 identified can represent the American football stadium for the Atlanta Falcons™. The situation module 508 can determine the situation type 326 based on identifying the situation 314. For example, the situation module 508 can identify the situation 314 to be the two minute warning for the second half based on receiving the game clock information from the external source via the first control interface 422. The external source can represent the stadium clock within the venue 204. For another example, the situation module 508 can determine the situation 314 to be players from the 49ers™ receiving the football within the end zone. The situation module 508 can receive the scoring information for the 49ers™ from the external source via the first control interface 422. Based on the factors above, the situation module 508 can determine the situation type 326 to represent touchdown for the 49ers™. Moreover, the situation module 508 can identify the environmental condition 324 to be the 49ers™ scored against the Falcons™ based on the situation type 326.

The context module 502 can include a context determinator module 510, which can couple to the venue module 504, the audience module 506, the situation module 508, or a combination thereof. The context determinator module 510 determines the context 322. For example, the context determinator module 510 can determine the context 322 based on the environmental condition 324 identified.

The context determinator module 510 can determine the context 322 in a number of ways. For example, the context determinator module 510 can determine the context 322 based on assessing the environmental condition 324. More specifically, assessing the environmental condition can include selecting, filtering, aggregating, combining, analyzing, or a combination thereof the environmental condition 324, such as the venue type 210, the audience type 312, the situation type 326, or a combination thereof. Continuing from the previous example, the environmental condition 324 can represent the user of the first device 102, who is a 49ers™ fan, is sitting in the home crowd section of the Falcons™' stadium. Based on assessing the venue type 210, the audience type 312, or a combination thereof, the context determinator module 510 can determine the context 322 where the user of the first device 102 is situated to be hostile away environment for the 49ers™ fan.

For another example, the situation type 326 identified can represent the last two minutes of the football game with the 49ers™ slightly leading the game by a field goal points. The context determinator module 510 can determine the context 322 to represent a noisy condition, as the Falcons™ fan can be rallying the team to take the lead against the 49ers™. The context module 502 can send the context 322 to a referencing module 512.

The content delivery system 100 can include the referencing module 512, which can couple to the context module 502. The referencing module 512 identifies the registration type 218 of FIG. 2. For example, the referencing module 512 can identify the registration type 218 based on calibrating the current location 214 of FIG. 2 of the first device 102 with the location marker 212 of FIG. 2.

The referencing module 512 can include a calibration module 514. The calibration module 514 calibrates the current location 214 of the first device 102. For example, the calibration module 514 can calibrate the current location 214 based on identifying the location marker 212. More specifically, the location marker 212 can represent an electric beacon. The electric beacon can represent a device which can mark a fixed physical location and identify the bearing or direction of the first device 102 relative to the electric beacon. For example, the electric beacon can represent a radio beacon.

For a specific example, the calibration module 514, via the location unit 420, can calibrate the current location 214 based on locating the first device 102 in the venue 204. The calibration module 514 can calibrate the current location 214 by triangulating the GPS location information of the first device 102 in relation to a plurality of the location marker 212 placed in the venue 204. More specifically, the calibration module 514 can receive via the first control interface 422, for example, the radio signal from a plurality of the electric beacon to determine where in the venue 204 is the user of the first device 102 sitting. For another example, the venue 204 can represent a theater with each seats having the location marker 212 representing radio frequency identification (RFID). The calibration module 514 can calibrate the current location 214 based on detecting the radio signal from RFID to identify where in the theater is the user of the first device 102 sitting.

For a different example, the calibration module 514 can calibrate the current location 214 by determining the orientation 216 of FIG. 2 of the user of the first device 102 respect to the location marker 212. For example, the location marker 212 can be located at the press box of the stadium aligned to the 50 yard line. The calibration module 514 can determine the current location 214 of the first device 102 to be at the 50 yard line based on triangulating with the location marker 212. More specifically, the calibration module 514 can determine the orientation 216 of the user of the first device 102 to face the 50 yard line based on the current location 214. The calibration module 514 can send the current location 214 calibrated to a registration module 516.

The referencing module 512 can include the registration module 516, which can couple to the calibration module 514. The registration module 516 identifies the registration type 218. For example the registration module 516 can identify the registration type 218 based on current location 214 calibrated.

The registration module 516 can identify the registration type 218 in a number of ways. For example, the registration module 516 can identify the registration type 218 based on the current location 214 of where the user is sitting in the venue 204. More specifically, the current location 214 can represent a courtside seat, a box seat, an upper deck seat, or an end zone seat within the venue 204. The registration module 516 can identify the registration type 218 to represent the end zone based on the current location 214 of the first device 102 located at the end zone seat.

For another example, the registration module 516 can identify the registration type 218 based on the orientation 216 of the user of the first device 102 within the venue 204.

The orientation 216 can represent the user of the first device 102 facing the corner of the home team end zone. More specifically, the orientation 216 can represent the user of the first device 102 seated at five rows from the field level. The registration module 516 can identify the registration type 218 where the user to be seated at the field level on the home team side. The referencing module 512 can send the registration type 218 to a subject module 518.

The content delivery system 100 can include the subject module 518, which can couple to the referencing module 512. The subject module 518 tracks the subject of interest 310 of FIG. 3. For example, the subject module 518 can track the subject of interest 310 based on identifying the subject of interest 310.

The subject module 518 can include an identifier module 520. The identifier module 520 identifies the subject of interest 310. The identifier module 520 can identify the subject of interest 310 in a number of ways. For example, the identifier module 520 can identify the subject of interest 310 based on the user's interest 330. The user's interest 330 can represent a specific player on the 49ers™. The user's interest 330 can represent "Quarterback" of the 49ers™.

The identifier module 520 can identify the subject of interest 310 based on a number of cameras placed in the venue 204. More specifically, the venue 204 can have cameras placed on the field to capture the situation 314 occurring on the field from different angles. The identifier module 520 can receive the images of the situation 314 captured by the cameras. Furthermore, the identifier module 520 can identify the subject of interest 310 based on filtering the images according to the jersey number on the player's jersey, the location of the player on the field, or a combination thereof.

For another example, the identifier module 520 can identify the subject of interest 310 based on receiving the subject information 308 of FIG. 3 related to the subject of interest 310 from external sources via the first control interface 422. The external source can represent major sports network, website, or a combination thereof. More specifically, the external sources can provide the subject information 308, such as the player's statistics, real time news update, or a combination thereof. The identifier module 520 can identify the subject of interest 310 by selecting the subject information 308 from the external sources.

For a different example, the identifier module 520 can identify the subject of interest 310 based on the social status 328 of FIG. 3. The social status 328 can represent the number of positive feedbacks on the SNS. The identifier module 520 can identify the subject of interest 310 based on selecting the player with the highest value of the social status 328.

For another example, the identifier module 520 can identify the subject of interest 310 based on the context 322. The context 322 can include the situation type 326 of the 49ers on the offense. Initially, the situation type 326 can represent the 49ers™ on the 20 yard line on their side of the field. As the 49ers™ progress down the field, the situation type 326 can represent the 49ers™ on the 30 yard line on the opponent's side of the field. Based on the combination of the user's interest 330 and the situation type 326, the identifier module 520 can identify the subject of interest 310 of "Quarterback" when the situation type 326 is 49ers on the 30 yard line on the opponent's side. The identifier module 520 can send the subject of interest 310 to a tracker module 522.

The subject module 518 can include the tracker module 522, which can couple to the identifier module 520. The tracker module 522 tracks the subject of interest 310. For example, the tracker module 522 can track the subject of interest 310 based on the context 322.

The tracker module 522 can track the subject of interest 310 in a number of ways. For example, the tracker module 522 can track the subject of interest 310 by continuously identifying the subject of interest 310 based on the images captured by the cameras on the field, the subject information 308 provided by the external sources, or a combination thereof. For another example, the tracker module 522 can track the subject of interest 310 based on the context 322. More specifically, the context 322 can represent the situation type 326 of where the 49ers™ is in the red zone and is in threat to score a touchdown. The red zone can represent a situation where the team in offence is within the 20 yard line of the opponent side of field in American football. The tracker module 522 can start tracking the subject of interest 310 when the situation type 326 represents a scoring situation within the red zone.

For another example, the tracker module 522 can track the subject of interest 310 based on the organization status 318 of FIG. 3. As discussed above, the organization status 318 of the subject of interest 310 can represent the prima ballerina within the ballet company. The tracker module 522 can track the subject of interest 310 when the subject of interest 310 with the organization status 318 of prima ballerina is on the stage performing. The subject module 518 can send the subject of interest 310 tracked to a source module 524.

The content delivery system 100 can include the source module 524, which can couple to the subject module 518. The source module 524 determines the information source 304 of FIG. 3. For example, the source module 524 can determine the information source 304 based on the subject location 316 of FIG. 3.

The source module 524 can determine the information source 304 in a number of ways. For example, the source module 524 can determine the information source 304 based on the subject location 316 within the venue 204, the audience type 312, or a combination thereof. Continuing from the previous example, the subject of interest 310 can represent "Quarterback." The subject location 316 of the subject of interest 310 can represent in the red zone area of the football field on the home crowd end zone side. The audience type 312 surrounding the home crowd end zone can represent the audience member 306 of FIG. 3 of a diehard fan. The source module 524 can determine the information source 304 for the overlay content 302 of FIG. 3 to be the audience member 306 with the audience type 312 of diehard fan sitting closest to the subject location 316. The audience member 306 can use a device with the content delivery system 100 to interact with the first device 102 of the user.

For another example, the source module 524 can determine the information source 304 based on the context 322. The context 322 can include the situation type 326 of the 49ers™ threatening to score from the 5 yard line. Based on the context 322, the source module 524 can determine the information source 304 by filtering the information source 304 for limiting the overlay content 302 to be received. More specifically, the source module 524 can determine the information source 304 by selecting the audience member 306 sitting around the end zone on the side where the touchdown is about to be scored and filtering out the audience type 312 for the audience member 306 sitting on the opposite end of the field.

For a different example, the source module 524 can determine the information source 304 based on the social status 328. More particularly, the source module 524 can determine the information source 304 by selecting the information source 304 having the highest of the social status 328. The highest of the social status 328 can represent the information source 304 representing the audience member 306 having the most number of followers, fans, or friends who subscribe to the information source 304 on the SNS. The social status 328 can also represent the information source 304 belonging to a reputable media source. The reputable media source can represent a major media network. The highest of the social status 328 can represent the information source 304 being known as an award winning reporter. By basing the determination of the information source 304 based on the social status 328, the source module 524 can filter the information source 304 with low credibility.

For another example, the source module 524 can determine the information source 304 based on the registration type 218. The registration type 218 can represent a stage level section that is two rows from the stage for the venue 204 representing a theater. Because of the close distance from the stage of the theater, the user of the first device 102 may not have an overview perspective of the entire stage. Based on the registration type 218, the source module 524 can determine the information source 304 based on selecting the information source 304 with the audience type 312 of mezzanine level in the venue 204 who can provide the subject information 308 regarding the overview perspective of the situation 314. The source module 524 can send the information source 304 to a content module 526.

The content delivery system 100 can include the content module 526, which can couple to the source module 524. The content module 526 generates the overlay content 302. For example, the content module 526 can generate the overlay content 302 based on the user's interest 330.

The content module 526 can generate the overlay content 302 in a number of ways. For example, the content module 526 can generate the overlay content 302 for the subject of interest 310 pertaining to the user's interest 330. Continuing from the previous example, the user's interest 330 can represent "Quarterback." And the subject of interest 310 determined can represent "Quarterback." The content module 526 can generate the overlay content 302 based on extracting for the subject information 308 for the subject of interest 310 from the information source 304 via the first control interface 422. More specifically, the content module 526 can generate the overlay content 302 by extracting the subject information 308 related to touchdown scoring percentage by a run by a quarterback when he is in the red zone from the information source 304 representing a sports broadcasting network.

For another example, the content module 526 can generate the overlay content 302 based on the context 322. The context 322 can include the situation type 326 of the 49ers™ in the red zone. The content module 526 can generate the overlay content 302 pertaining to the situation type 326 by filtering for the subject information 308 related to the statistics for the 49ers™' chance of scoring when the team is within the red zone.

Furthermore, the content module 526 can generate the overlay content 302 based on receiving the subject information 308 from the audience member 306 with the audience type 312 selected for the context 322. More specifically, the content module 526 can receive the subject information 308 from the audience member 306 with the audience type 312 sitting closest to the action on the field. The audience member 306 can share the subject information 308 via the device having the content delivery system 100 on the SNS to present his opinion on the subject of interest 310, the situation 314, or a combination thereof. The content module 526 can receive the subject information 308 from the audience member 306 via the first control interface 422 for generating the overlay content 302 relevant to the context 322.

For a different example, the content module 526 can generate the overlay content 302 based on the registration type 218. If the registration type 218 of the user is the field level, the content module 526 can generate the overlay content 302 related to the overview perspective of the field. More specifically, the overlay content 302 generated can represent the subject information 308 related to the subject of interest 310 on the other side of the field where the user has hard time viewing the situation 314. In contrast, if the registration type 218 of the user is the upper furthest section within the venue 204, the content module 526 can generate the overlay content 302 related to the side line information of the venue 204 to provide up and close perspective of the situation 314 occurring. The audience member 306 can represent the information source 304 for providing the up and close perspective of the situation 314. The content module 526 can send the overlay content 302 to a display module 528.

It has been discovered that the content delivery system 100 can improve the quality of the overlay content 302 by generating the overlay content 302 based on the audience type 312. By filtering the audience member 306 based on the audience type 312, the content delivery system 100 can select base the generation of the overlay content 302 on the subject information 308 most pertinent and accurate for the context 322. As a result, the improvement results in the enhanced user experience for operating the first device 102 and the content delivery system 100.

The content delivery system 100 can include the display module 528, which can couple to the content module 526. The display module 528 displays the overlay content 302. For example, the display module 528 can display the overlay content 302 on the first device 102.

The display module 528 can display the overlay content 302 in a number of ways. For example, the display module 528 can display the overlay content 302 based on the context 322. More specifically, the context 322 can represent the situation type 326 of a questionable call by the referee for the situation 314 of the opposing team making a catch. The display module 528 can display the overlay content 302 generated for the context 322 by presenting the opinion shared by the audience member 306 related to the situation 314.

For another example, the display module 528 can update the display of the overlay content 302 based on the situation 314 of the subject of interest 310. More specifically, the situation 314 of the subject of interest 310 can represent being subbed out and is not on the field. The display module 528 can display the overlay content 302 when the subject of interest 310 is back on the field and not display the overlay content 302 if the subject of interest 310 is off the field.

For illustrative purposes, the content delivery system 100 is shown with the context module 502 determining the context 322, although it is understood that the context module 502 can be operated differently. For example, the context module 502 can update the context 322.

The context module 502 can include a context updater module 530, which updates the context 322. For example, the context updater module 530 can update the context 322 based on the change in the situation type 326. More specifically, the situation type 326 can represent the 49ers™ leading the Falcons™. However, the situation type 326 can change from the Falcons™ taking the lead over the 49ers™. Based on the change in the situation type 326, the context updater module 530 can update the context 322 from hostile environment to non-hostile environment for the 49er fan.

For illustrative purposes, the content delivery system 100 is shown with the tracker module 522 tracking the subject of interest 310, although it is understood that the tracker module 522 can be operated differently. For example, the tracker module 522 can detect the status change 320 of FIG. 3.

More specifically, the tracker module 522 can detect the status change 320 based on the context 322. For example, the context 322 can represent the situation type 326 of the 49ers™ scoring a touchdown, thus the offensive squad can go off to allow the special team to kick off. The tracker module 522 can detect the status change 320 of the subject of interest 310 by detecting the subject location 316 as off the field.

For illustrative purposes, the content delivery system 100 is shown with the source module 524 determining the information source 304, although it is understood that the source module 524 can be operated differently. For example, the source module 524 can update the information source 304 based on the status change 320, the context 322, or a combination thereof.

For example, the source module 524 can update the information source 304 based on the status change 320 of the subject of interest 310. The status change 320 of the subject of interest 310 can change from the subject of interest 310 being on the field to being off the field. The information source 304 for when the subject of interest 310 is on the field can represent the audience member 306 with the audience type 312 of box seats. When the status change 320 occurs, thus, the subject of interest 310 is on the side line, the source module 524 can update the information source 304 to the audience member 306 with the audience type 312 of field level.

For a different example, the source module 524 can update the information source 304 based on the change in the context 322. The context 322 can represent the weather condition of rain. When the weather condition is rain, the source module 524 can determine the information source 304 to represent the major sports network as the audience member 306 can be less active providing the subject information 308. If the weather condition improves to sunny, thus, the audience member 306 can be more willing to share the subject information 308, the source module 524 can update the information source 304 to the audience member 306 to receive the subject information 308.

It has been discovered that the content delivery system 100 can improve the generation of the overlay content 302 based on determining the information source 304 according to the status change 320, the context 322, or a combination thereof. By changing the information source 304 according to the status change 320, the context 322, or a combination thereof, the content delivery system 100 can efficiently obtain the subject information 308 relevant to the user of the first device 102. As a result, the improvement results in the enhanced user experience for operating the first device 102 and the content delivery system 100.

For illustrative purposes, the content delivery system 100 is shown with the content module 526 generating the overlay content 302, although it is understood that the content module 526 can be operated differently. For example, the content module 526 can update the overlay content 302 based on the change in the information source 304.

Continuing from the previous example, the information source 304 can represent major sports network to receive expert opinion related to the subject of interest 310. However, the user's interest 330 can seek the opinions of the audience member 306 rather than the opinions of the expert. As the information source 304 is changed, the content module 526 can update the overlay content 302 based on the change in the information source 304.

The physical transformation for determining the context 304 results in the movement in the physical world, such as people using the first device 102, based on the operation of the content delivery system 100. As the movement in the physical world occurs, the movement itself creates additional information that is converted back into updating the context 322, the information source 304, or a combination thereof for updating the overlay content 302 for the continued operation of the content delivery system 100 and to continue movement in the physical world.

The first software 426 of FIG. 4 of the first device 102 of FIG. 4 can include the content delivery system 100. For example, the first software 426 can include the context module 502, the referencing module 512, the subject module 518, the source module 524, the content module 526, and the display module 528.

The first control unit 412 of FIG. 4 can execute the first software 426 for the context module 502 to determine the context 322. The first control unit 412 can execute the first software 426 for the referencing module 512 to identify the registration type 218. The first control unit 412 can execute the first software 426 for the subject module 518 to track the subject of interest 310. The first control unit 412 can execute the first software 426 for the source module 524 to determine the information source 304. The first control unit 412 can execute the first software 426 for the content module 526 to generate the overlay content 302. The first control unit 412 can execute the first software 426 for the display module 528 to display the overlay content 302.

The second software 442 of FIG. 4 of the second device 106 of FIG. 4 can include the content delivery system 100. For example, the second software 442 can include the context module 502, the referencing module 512, the subject module 518, the source module 524, the content module 526, and the display module 528.

The second control unit 434 of FIG. 4 can execute the second software 442 for the context module 502 to determine the context 322. The second control unit 434 can execute the second software 442 for the referencing module 512 to identify the registration type 218. The second control unit 434 can execute the second software 442 for the subject module 518 to track the subject of interest 310. The second control unit 434 can execute the second software 442 for the source module 524 to determine the information source 304. The second control unit 434 can execute the second software 442 for the content module 526 to generate the overlay content 302. The second control unit 434 can execute the second software 442 for the display module 528 to display the overlay content 302.

The content delivery system 100 can be partitioned between the first software 426 and the second software 442. For example, the second software 442 can include the context module 502, the referencing module 512, the subject module 518, the source module 524, and the content module 526. The second control unit 434 can execute modules partitioned on the second software 442 as previously described.

The first software 426 can include the display module 528. Based on the size of the first storage unit 414, the first software 426 can include additional modules of the content delivery system 100. The first control unit 412 can execute the modules partitioned on the first software 426 as previously described.

The first control unit 412 can operate the first communication unit 416 of FIG. 4 to send the user's interest 330 to the second device 106. The first control unit 412 can operate the first software 426 to operate the location unit 420. The second communication unit 436 of FIG. 4 can send the overlay content 302 to the first device 102 through the communication path 104 of FIG. 10.

The content delivery system 100 describes the module functions or order as an example. The modules can be partitioned differently. For example, the context determinator module 510 and the context updater module 530 can be combined. Each of the modules can operate individually and independently of the other modules. Furthermore, data generated in one module can be used by another module without being directly coupled to each other. For example, the content module 526 can receive the context 322 from the context module 502.

The modules described in this application can be hardware circuitry, hardware implementation, or hardware accelerators in the first control unit 412 or in the second control unit 434. The modules can also be hardware circuitry, hardware implementation, or hardware accelerators within the first device 102 or the second device 106 but outside of the first control unit 412 or the second control unit 434, respectively.

It has been discovered that the content delivery system 100 generating the overlay content 302 based on the information source 304 selected for the registration type 218 can improve the quality of the overlay content 302 presented on the first device 102. By determining the information source 304 based on the registration type 218, the content delivery system 100 can improve the accuracy and pertinence of the overlay content 302 generated regarding the subject of interest 310. As a result, the improvement results in the enhanced user experience for operating the first device 102 and the content delivery system 100.

Figure 6:
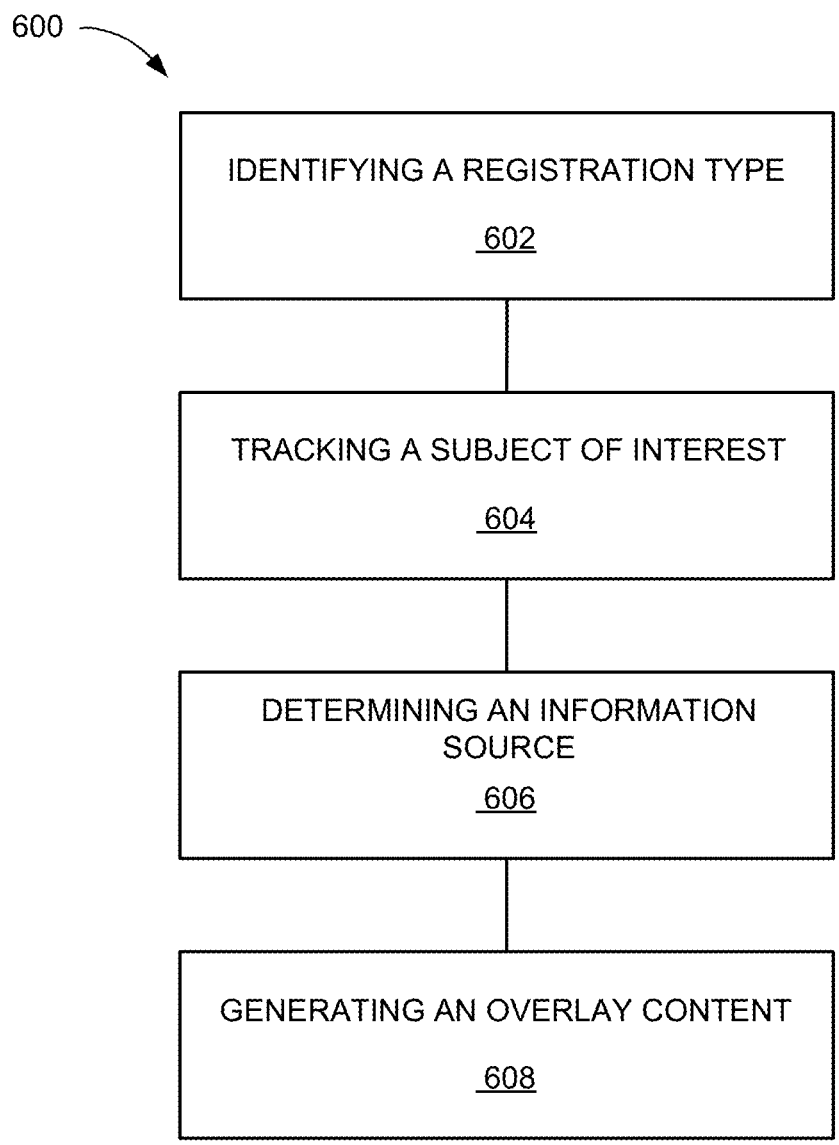
FIG. 6 is a flow chart of a method of operation of a content delivery system in an embodiment of the present invention.

Referring now to FIG. 6, therein is shown a flow chart of a method 600 of operation of a content delivery system 100 in an embodiment of the present invention. The method 600 includes: identifying a registration type for calibrating a current location of a device in a block 602; tracking a subject of interest based on a context in a block 604; determining an information source based on the registration type in a block 606; and generating an overlay content based on the information source with a control unit for displaying the overlay content for the subject of interest on the device in a block 608.

It has been discovered that the content delivery system 100 generating the overlay content 302 of FIG. 3 based on the information source 304 of FIG. 3 selected for the registration type 218 of FIG. 2 can improve the quality of the overlay content 302 presented on the first device 102 of FIG. 1. By determining the information source 304 based on the registration type 218, the content delivery system 100 can improve the accuracy and pertinence of the overlay content 302 generated regarding the subject of interest 310 of FIG. 3. Additionally, the content delivery system 100 tracking the subject of interest 310 based on the organization status 318 of FIG. 3 improves the efficiency of when the content delivery system 100 should focus on obtaining the subject information 308 of FIG. 3. As a result, the improvement results in the enhanced user experience for operating the first device 102 and the content delivery system 100.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the embodiment of the present invention is that it valuably supports and services the historical trend of reducing costs, simplifying systems, and increasing performance. These and other valuable aspects of the embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A content delivery system comprising:
a control unit including a processor configured to:
identify a registration type representing a section of a venue for calibrating a current location of a device within the registration type,
determine an information source providing subject information based on the registration type for filtering an audience type of an audience member representing the information source located in the registration type,
generate an overlay content based on the registration type of the information source different from the registration type of the current location by updating the information source based on a status change of a subject of interest and a change in a context for obtaining the subject information for providing a perspective of a situation different from the situation viewed from the current location and the perspective of the subject of interest different from viewed prior to the status change and the change in the context, and
a communication unit including a microelectronic, coupled to the control unit, configured to transmit the overlay content for displaying the overlay content on the device.

2. The system as claimed in claim 1 wherein the control unit is configured to identify the subject of interest based on the context for tracking the subject of interest for a situation type.

3. The system as claimed in claim 1 wherein the control unit is configured to identify the registration type based on an orientation for identifying the device relative to a location marker.

4. The system as claimed in claim 1 wherein the control unit is configured to determine the information source based on a subject location of the subject of interest for filtering the audience type of the information source.

5. The system as claimed in claim 1 wherein the control unit is configured to determine a context based on an environmental condition.

6. The system as claimed in claim 1 wherein the control unit is configured to update the information source based on the status change of the subject of interest.

7. The system as claimed in claim 1 wherein the control unit is configured to generate the overlay content based on the registration type for filtering the audience type of the information source.

8. The system as claimed in claim 1 wherein the control unit is configured to track the subject of interest based on the organization status of the subject of interest.

9. The system as claimed in claim 1 wherein the control unit is configured to detect the status change based on the context for tracking the subject of interest.

10. A method of operation of a content delivery system comprising:
   identifying a registration type representing a section of a venue for calibrating a current location of a device within the registration type;
   determining an information source providing subject information based on the registration type for filtering an audience type of an audience member representing the information source also located in the registration type where the current location is located; and
   generating an overlay content based on the registration type of the information source different from the registration type of the current location with a control unit by updating the information source based on a status change of a subject of interest and a change in a context for obtaining the subject information for providing a perspective of a situation different from the situation viewed from the current location and the perspective of the subject of interest different from viewed prior to the status change and the change in the context for displaying the overlay content on the device.

11. The method as claimed in claim 10 further comprising identifying the subject of interest based on the context for tracking the subject of interest for a situation type.

12. The method as claimed in claim 10 wherein identifying the registration type includes identifying the registration type based on an orientation for identifying the device relative to a location marker.

13. The method as claimed in claim 10 wherein determining the information source includes determining the information source based on a subject location of the subject of interest for filtering the audience type of the information source.

14. A non-transitory computer readable medium including steps executable by a control unit, the steps comprising:
   determining a context based on an environmental condition;
   identifying a registration type representing a section of a venue for calibrating a current location of a device within the registration type;
   determining an information source providing subject information based on the registration type for filtering an audience type of an audience member representing the information source also located in the registration type where the current location is located; and
   generating an overlay content based on the registration type of the information source different from the registration type of the current location by updating the information source based on a status change of a subject of interest and a change in a context for obtaining the subject information for providing a perspective of a situation different from the situation viewed from the current location and the perspective of the subject of interest different from viewed prior to the status change and the change in the context for displaying the overlay content on the device.

15. The non-transitory computer readable medium including steps as claimed in claim 14 further comprising updating the information source based on the status change of the subject of interest.

16. The non-transitory computer readable medium including steps as claimed in claim 14 wherein generating the overlay content includes generating the overlay content based on the registration type for filtering the audience type of the information source.

17. The non-transitory computer readable medium including steps as claimed in claim 14 further comprising tracking the subject of interest based on the organization status of the subject of interest.

18. The non-transitory computer readable medium including steps as claimed in claim 14 further comprising detecting the status change based on the context for tracking the subject of interest.

* * * * *